United States Patent

[11] 3,582,762

| [72] | Inventors | Kazumasa Mori;<br>Hisato Wakamatsu, both of Kariya-shi,<br>Japan |
|---|---|---|
| [21] | Appl. No. | 819,382 |
| [22] | Filed | Apr. 25, 1969 |
| [45] | Patented | June 1, 1971 |
| [73] | Assignee | Nippon Denso Company Limited<br>Kariya-shi, Japan |
| [32] | Priority | Apr. 27, 1968, Apr. 27, 1968, Aug. 13,<br>1968, Aug. 13, 1968 |
| [33] | | Japan |
| [31] | | 43/28461, 43/28462, 43/57505 and<br>43/57506 |

[54] INTEGRATED CIRCUIT SEMICONDUCTOR-TYPE VOLTAGE REGULATOR AND CHARGING GENERATOR APPARATUS EQUIPPED WITH THE SAME
6 Claims, 11 Drawing Figs.

[52] U.S. Cl. .................................................... 322/28,
317/100, 322/73
[51] Int. Cl. ................................................. H02p 9/30
[50] Field of Search ............................................ 322/28;
317/100; 174/H.S.

[56] References Cited
UNITED STATES PATENTS
3,439,255  4/1969  Carnes et al. ............... 322/28

Primary Examiner—Oris L. Rader
Assistant Examiner—H. Huberfeld
Attorney—Cushman, Darby & Cushman ABSTRACT: A semiconductor-type voltage regulator principally constituted by semiconductors such as transistors, diodes, and the like without having any electrical contact, which is adapted to enhance the effect of radiation and to be small in size and is incorporated with a generator without lead wires to thereby simplify the structure of a charging generator apparatus including said generator.

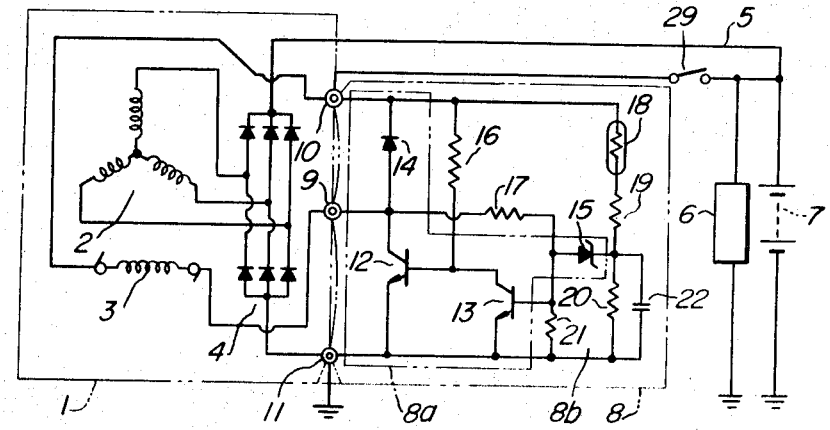
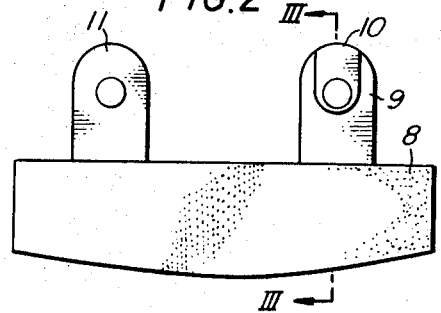
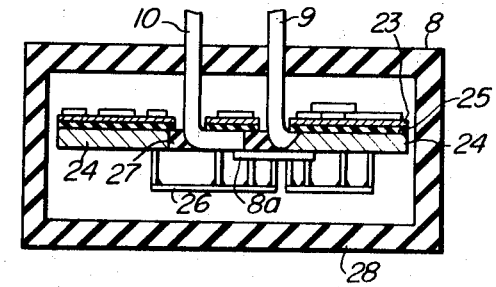
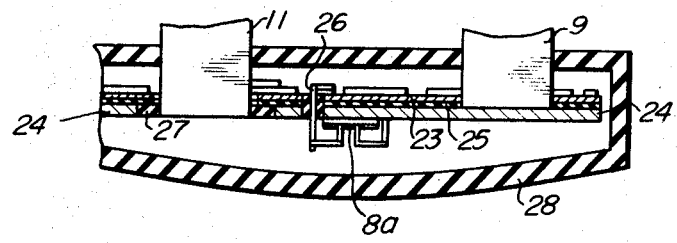

INVENTORS
Kazumasa Mori
Hisato Wakamatsu

BY Cushman, Darby & Cushman
ATTORNEYS

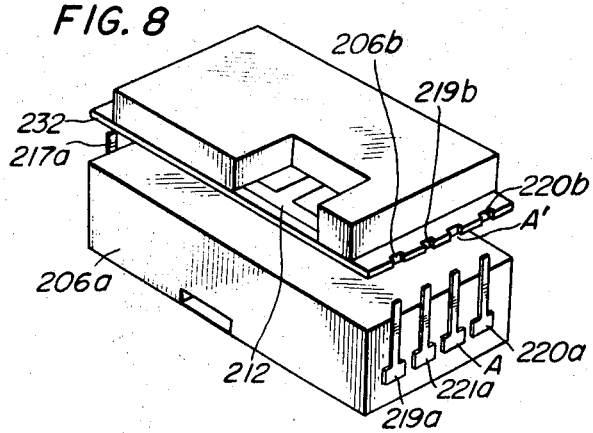
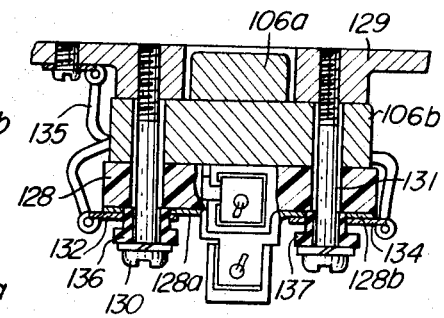
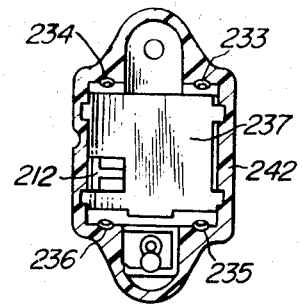
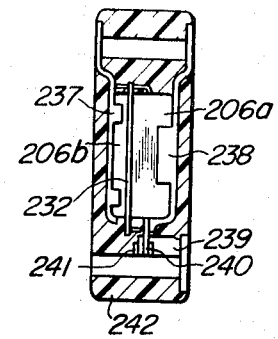
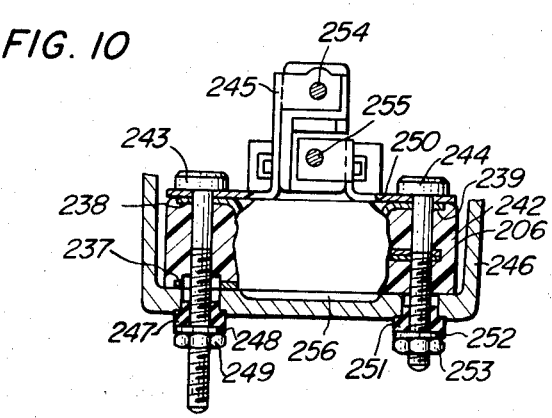

3,582,762

INTEGRATED CIRCUIT SEMICONDUCTOR-TYPE VOLTAGE REGULATOR AND CHARGING GENERATOR APPARATUS EQUIPPED WITH THE SAME

BACKGROUND OF THE INVENTION

1. Field of the Invention

The present invention relates to semiconductor-type voltage regulators in charging generator apparatuses for use in vehicles for charging batteries mounted on the vehicles and charging generator apparatuses equipped therewith.

2. Description of the Prior Art

It is well known that the prior charging device for use in vehicles comprises a generator constituting a power source and a voltage regulator for maintaining the output voltage of the generator constant regardless of a revolution variation of the generator and variation of load current. As voltage regulators, there are publicly known the contact type having electrical contacts and the semiconductor type one having no contact members and principally constituted by semiconductors such as transistors, diodes, and the like. The former type, however, has such an inevitable drawback that it is too bulky, and therefore, the latter semiconductor type has been principally employed as voltage regulators. In particular, since development has recently been made in the techniques of packing semiconductor elements such as transistors, diodes, etc. in high density and integrated circuit techniques to thereby enable microminiaturization of voltage regulator circuits, the development of said semiconductor-type voltage regulator can be expected.

However, heretofore the idea of incorporating the voltage regulator in the generator integrally has not yet been considered and hence, the voltage regulator and the generator have usually been provided separately from each other. Thus, the separation of the generator and the voltage regulator is disadvantageous in that a circuit for electrically connecting the both is inevitably necessary, so that not only the wiring for connection is troublesome, but also possible factors of trouble such as defective connections and breakage of wire are present therein. In the case of employing a semiconductor-type voltage regulator, however, it has been considered to securely mount the voltage regulator merely on the bracket of a generator. In this case, the length of the wire for connecting the voltage regulator with the generator is merely made shorter, but the above-mentioned possible dangerous factors can not be avoided. In addition, the semiconductor-type voltage regulator is small in size as compared with the contact-type regulator, but at present, since cooling fins for dispersing heat which semiconductor elements used radiate are large in size, there is difficulty in obtaining a space for mounting the fins especially within the bracket of the generator.

Further, the semiconductor-type voltage regulator is provided with many active elements such as transistors and diodes, and many passive elements such as resistors, capacitors and others, and therefore, if all voltage regulator circuits are made in the form of a monolothic integrated circuit, then the circuit is of an uneconomical design, disadvantageously resulting in an very expensive regulator.

On the other hand, in charging generator apparatuses for vehicle use, there are many kinds of generators such as the 6-volts type, 12-volts type, 24-volts type in accordance with the magnitude of electrical loads used in a vehicle. Accordingly, a voltage regulator for use with the generator having various regulator voltage characteristics corresponding to the above-mentioned generator types is required. Thus, it is quite uneconomical to manufacture a specified use voltage regulator according to said required regulation voltage characteristics individually. In the future, electrical loads in vehicles will tend to increase, so that higher power generators are required. The problem, therefore occurs that new type regulators must be manufactured to be adapted to the generators.

Further, heretofore it has been considered to mount a semiconductor-type voltage regulator on a generator for vehicle use integrally. However, the wiring between the regulator and the output terminal or brush of the generator is troublesome and in practice, various problems arise therein.

SUMMARY OF THE INVENTION

An object of the present invention is to provide a semiconductor-type voltage regulator for use in a generator including a plurality of connecting terminals and a radiating plate for dispersing the radiation heat of semiconductors, wherein said connecting terminals are adapted to be electrically connected with a generator and serve as fitting legs for the generator, and said radiating plate is thermally conductively constituted integrally with said connecting terminals.

In accordance with the present invention, there are provided such advantageous effects that by securely fitting the regulator on the generator a desired electrical connection therebetween can be carried out concurrently, so that no wiring is required for such connection, wiring members and wiring cost can be drastically reduced, and factors of possible danger such as the trouble of disconnection and erroneous connections can be completely eliminated. Further, in such a construction, heat conducted to the radiating plate can be introduced through the connecting terminals in the section on which the generator is mounted. The thermal conductivity results in much increased effects of radiation and the prevention of thermal concentration in the interior of the regulator, so that miniaturization of radiating plates and thus of the overall regulator can be effectively achieved.

Another object of the present invention is to provide a semiconductor-type voltage regulator for a generator comprising a relay circuit member principally composed of a Zener diode for detecting a voltage generated and active elements including at least transistors for interrupting the energization for the field winding of the generator, and passive element circuit member composed of dividing resistors for establishing a voltage applied to the Zener diode of said relay circuit member, capacitors and etc., each of said circuit member being an integrated circuit.

In accordance with the present invention, by replacing only one of the circuit members, for example, the relay circuit member or the passive element circuit member with an appropriate one, the preset voltage of the regulator can be easily changed into a desired value, the other of the member can always be used in common with various kinds of generators used, thus providing excellent economical effects.

A further object of the present invention is to provide a semiconductor-type voltage regulator having a relay circuit member and a passive element circuit member, comprising a plurality of lead terminals provided in the relay circuit member, said terminal being constructed in such a manner that conductive pieces connected with active elements in the member are bent along an edge of the circuit member, lead terminals provided in said passive element circuit member, which is engageable with said plurality of lead terminals, and an externally adjustable resistor in said passive element circuit member.

In accordance with the present invention, the relay circuit member and the passive element circuit member can be formed of integrated circuits suitable for the respective members, respectively. That is, for example, the relay circuit member and the passive element circuit member can be formed of a semiconductor integrated circuit member and a thick film integrated circuit, respectively. Accordingly, a design of economical integrated circuits is made possible, thus providing such an excellent effect that a remarkably inexpensive voltage regulator can be provide as compared with the case where the whole voltage regulator circuit is formed of a monolithic integrated circuit in which an integrated circuit is formed on one substrate.

Further, since the apparatus according to the present invention provides a plurality of lead wires in the relay circuit member wherein conductors connected to active elements of the circuit member are bent and lead wires in the passive element circuit member, said wires being engageable with said plurality of lead wires, the juncture of both circuit members gives rise to the completion of an electrical connection therebetween simultaneously, with the result that the construction of the voltage regulator can markedly be facilitated. Furthermore, since the present apparatus provides a variable resistor in the passive element circuit member, which resistor is externally adjustable for a set point of the regulator, the deviation of the present voltage can be eliminated by cutting the resistor after juncture of both circuit members, thus enabling to readily obtain a desired preset voltage in the regulator.

A further object of the present invention is to provide a charging generator apparatus equipped with a semiconductor-type voltage regulator comprising a member serving as a radiating plate as well as a terminal which is mounted on each of a relay circuit member and a passive element circuit member and fitting members of brushholder of the generator, said fitting members also being used to serve as those of the regulator, said combined radiating plate and terminal member and said fitting members being used to mount the regulator and the brushholder integrally on the generator and simultaneously to electrically connect the regulator between the brushholder and the generator.

In accordance with the present invention, the electrical connection between the generator, the voltage regulator and the brushholder can be made without using any lead wire and thus, a charging generator apparatus of a simple structure can be provided. In addition, since said electrical connection can be worked without employing any lead wire, assembly or disassembly of the charging generator apparatus is practically made simpler.

BRIEF DESCRIPTION OF THE DRAWING

FIG. 1 is an electrical circuit diagram of a charging generator apparatus for vehicle use equipped with a semiconductor-type voltage regulator of an embodiment according to the present invention;

FIG. 2 is a vertical view of the semiconductor-type voltage regulator according to the present invention;

FIG. 3 is an enlarged sectional view taken along line III-III of FIG. 2;

FIG. 4 is an enlarged longitudinally sectional view of the voltage regulator of the present invention shown in FIG. 2;

FIG. 6 is a partially sectional view showing an embodiment of mounting on a generator a semiconductor-type voltage regulator according to the present invention;

FIG. 8 is an oblique view for explaining the juncture of a relay circuit member and a passive element circuit member by which a semiconductor-type voltage regulator according to the present invention is constituted;

FIGS. 9a and 9b are a partially sectional front elevation and a partially sectional side elevation of a semiconductor-type voltage regulator according to an embodiment of the present invention, respectively; and FIG. 10 is a partially sectional view showing a construction in which a semiconductor-type voltage regulator according to the embodiment of the present invention is mounted on a generator.

DESCRIPTION OF THE PREFERRED EMBODIMENTS

Figure 5:
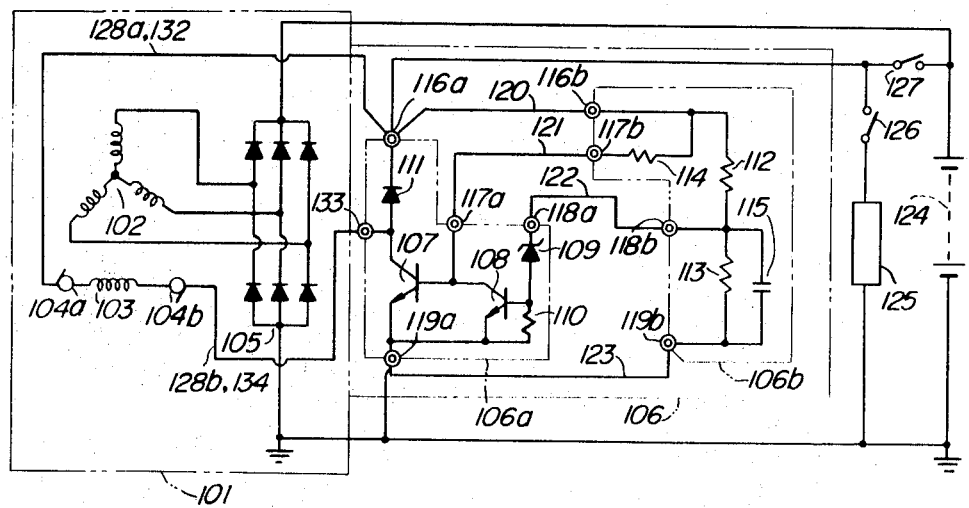
FIG. 5 is an electrical circuit diagram of a charging generator apparatus for vehicle use equipped with a semiconductor-type voltage regulator of another embodiment according to the present invention.

Referring to FIGS. 1 to 4, description will be made of one embodiment of the present invention hereunder. Reference numeral 1 designates a generator comprising stator windings 2 of the three-phase star connection, a field winding 3 and a full-wave rectifier 4, which is adapted to be driven by an engine of a vehicle, a DC output current of the generator which is rectified by the full-wave rectifier 4 being introduced through lead wires 5 into electrical loads 6, for example, head lamps of the vehicle, and batteries 7 for use in the vehicle.

Numeral 8 designates a semiconductor-type voltage regulator according to the present invention which comprises a plurality of prolonged connecting terminals 9, 10 and 11 which have a flat rectangular cross section and a hole for a mounting or setting bolt and which electrically connect the regulator with the generator 1 and also fit of the regulator 8 for the generator 1, said regulator being formed in saddle-shape as a whole. Two connecting terminals 9 and 10 of said terminals are located opposite to each other. The voltage regulator 8 is formed of a hybrid integrated circuit consisting of a semiconductor integrated circuit 8a integrating transistors 12 and 13 and diodes 14 and 15 and a thick film integrated circuit 8b integrating elements except the semiconductors, namely, resistors 16 to 21 and capacitor 22. Diode 15 is a Zener diode, the resistor 18 is one for temperature compensation, and the resistors 19 and 20 are dividing ones. Numeral 23 designates a ceramic substrate on which the resistors 16 to 21 and the capacitor 22 are baked and if required these elements are connected by soldering, thus forming a thick film integrated circuit 8b. Numeral 24 designates a radiating plate to which the semiconductor integrated circuit 8a is fixedly secured, for example, by welding and which is stacked with the ceramic substrate 23 through an insulation layer 25. Metal conductors 26 electrically couple between the semiconductor integrated circuit 8a and the thick film integrated circuit 8b, and between both said integrated circuits and the connecting terminals 9 to 11, respectively. Further, the connecting terminal 9 is formed integrally with the radiating plate 24 while the connecting terminals 10 and 11 are mounted on the radiating plate 24 within hole portions thereof at its predetermined positions through an insulator 27. Numeral 28 designates a casing made of an insulation material. The connecting terminal 10 of the voltage regulator 8 is connected through a key switch 29 to the batteries 7 carried on the vehicle and also electrically coupled with one end of the field winding 3 of the generator 1 while the connecting terminal 9 is electrically coupled with the other end of the field winding 3. The connecting terminal 11 is grounded. The electrical connection between the generator 1 and the voltage regulator 8 can be achieved by fitting the generator 1 with the terminals 9 to 11 of the regulator 8.

Now, the operation of the above-mentioned construction will be described hereunder. First, if the key switch 29 is closed, an enabling circuit is formed consisting of the batteries 7, the key switch 29, the connecting terminal 10, the field winding 3, the connecting terminal 9, the voltage regulator 8, and the connecting terminal 11, so that the generator is excited. If the engine is initiated the rotor of the generator 1 begins to rotate, whereby its stator windings 2 generate a three-phase AC voltage. The generated three-phase AC voltage is converted into a DC voltage by the full-wave rectifier 4, and said DC voltage is fed through lead wires 5 to the electrical loads 6 and the batteries 7 to thereby charge the batteries. When a generated voltage of the generator 1 exceeds a predetermined voltage value of the regulator 8; i.e. the voltage at the point between resistors 19 and 20 exceeds the Zener voltage of the Zener diode 15, the diode turns in its conductive state, and then the transistors 12 and 13 are reversed in their states, so that the energization of the field winding 3 is cut off. Thus, the voltage regulator 8 controls the output voltage of the generator 1 at a predetermined value so that the batteries 7 may always properly be charged.

Upon the above-mentioned voltage regulation, the semiconductor elements such as the transistors 12 and 13 and the diodes 14 and 15 which principally constitute the regulator 8 do emit appreciable heat. The heat is conducted to the radiating plate 24 and further conducted through the connecting terminal 9 to the regulator fitting portion of the generator 1.

As a result, the effect of radiation increases much as compared with the case where heat produced by the semiconductors used is radiated only by means of the radiating plate 9.

In this embodiment, the radiating plate 24 and the connecting terminal 9 are formed integrally so that both only may be thermally conductive. However, if as the insulation material 27 electrically isolating the other terminals 10 and 11 from the radiating plate 24 materials having good thermal conductivity such as mica or ceramic are used, the radiating plate 24 and all the connecting terminals 9 to 11 can be thermally conductively formed integrally in combination, to thereby enhance the effect of heat radiation. Furthermore, the manner of combining the connecting terminals 9 to 11 and the radiating plate 24 to be connected is not limited to the above-mentioned embodiment, and hence, such a manner may be taken that the connecting terminal 10 or 11 and the radiating plate 24 are formed integrally, or the terminals and the radiating plate 24 are fixedly secured by soldering, welding, etc. to one another. In either case it is essential to thermally conductively form at least one of the connecting terminals 9 to 11 and the radiating plate 24 for dispersing heat emitted in the semiconductor elements integrally.

By referring to FIGS. 5 and 6 the second embodiment of the present invention will now be described. Numeral 101 designates a rectifier-contained-type AC generator capable of being driven by an engine (not shown), which generator is of the known type comprising three-phase star connection-type armature windings 102, a field winding 103, a pair of brushes 104a and 104b, and a full-wave rectifier 105.

Numeral 106 designates a semiconductor-type voltage regulator in accordance with the present invention, which comprises a relay circuit member 106a principally including active elements such as transistors and diodes, and a passive element circuit member 106b having resistors and a capacitor. The relay circuit member 106a is composed of a transistor 107 interrupting energization of an L load or the field winding 103, a transistor 108 for switching the transistor 107, a voltage detecting Zener diode 109, a resistor 110 for biasing the transistor 8, and a diode 111 for absorbing a surge voltage across the L load.

On the other hand, the passive element circuit member 106b is composed of dividing resistors 112 and 113 for establishing a voltage applied to the Zener diode 109 of said relay circuit member 106a, a relay base resistor 114, and an oscillation preventing and operation stabilizing capacitor 115. Both the circuit members 106a and 106b whose respective terminals 116a and 116b, 117a and 117b, 118a and 118b, and 119a and 119b are electrically connected by respective conductors 120, 121, 122 and 123, respectively, provide required electrical connections therebetween. Further, the relay circuit member 106a and passive element circuit member 106b of the voltage regulator 106, respectively, are constructed by a semiconductor integrated circuit and a thick film integrated circuit in which passive elements are integrated by baking or evaporating these elements on a substrate of ceramic, which are suitable for integration of the constituent elements of the respective members, said integrated circuits being in the form of blocks. The relay circuit member 106a and the passive element circuit member 106b are detachably stacked.

Numeral 124 designates car batteries, 125 car electrical loads, 126 a load switch, and 127 a key switch. Brushholder 128 is made of insulation material by which the pair of brushes 104a and 104b are contained therein to be held, and includes electrically conductive plates 128a and 128b connected with the brushes 104a and 104b respectively. Numeral 129 designates an end bracket of the generator 101, and 130 and 131 fitting bolts. The brushholder 128 is stacked with the voltage regulator 106, and fixedly fitted on the interior of the bracket 129 with the fitting bolts 130 and 131. Now, the conductive plate 128a of the brushholder 128 and the other plate 128b thereof are pressingly engaged with a terminal plate 132 connected to the terminal 116a of the relay circuit member 106a and a terminal plate 134 connected to the remaining terminal 133, respectively, whereby the relay circuit member 106a is connected with the field winding 103. The terminal 119a of the relay circuit member 106a is adapted to have the same potential as that of the end bracket 129 through a conductor 135. In other words, the terminal 119a is grounded. Numerals 136 and 137 designate insulating bushes electrically isolating the terminals 132 and 134 from the fitting bolts 130 and 131, respectively.

Now, the operation of the above-mentioned construction according to this embodiment will be described.

First, when the key switch 127 is closed there is constituted a circuit consisting of the batteries 124, the key switch 127, the terminal 116a, the terminal plate 132, the conductive plate 128a, the brush 104a, the field winding 103, the brush 104b, the conductive plate 128b, the terminal plate 134, the terminal 133, the voltage regulator 106, and the terminal 119, in sequence, to thereby energize the generator 101. Then, when the engine is started the rotor of the generator 101 begins to rotate, so that a three-phase AC voltage generates across the armature windings 102. The generated three-phase AC voltage is converted into a DC voltage by the full-wave rectifier 105 and thereafter it is introduced to the batteries 124, thus charging the batteries. If the generated voltage of the generator 101 exceeds a predetermined voltage value of the voltage regulator 106; i.e. a voltage at the connection point between the dividing resistors 112 and 113 exceeds the Zener voltage of the Zener diode 109, the transistors 107 and 108 are reversed in their conductive states due to the fact that the diode 109 becomes conductive, so that the energization of the field winding 103 is shut off.

Thus, the voltage regulator 106 controls the output voltage of the generator 101 so that the batteries 124 may be charged properly all the time.

Furthermore, in the above-mentioned voltage regulator according to the second embodiment, by replacing the Zener diode 109 with one having a different Zener voltage of by changing the passive element circuit member 106b to one adapted in such a manner that a voltage applied to the Zener diode 109 is varied, the regulated voltage of the voltage regulator 106 can be altered at will.

Next, by referring to FIGS. 7 to 10, description will be made of a third embodiment in accordance with the present invention.

Figure 7:
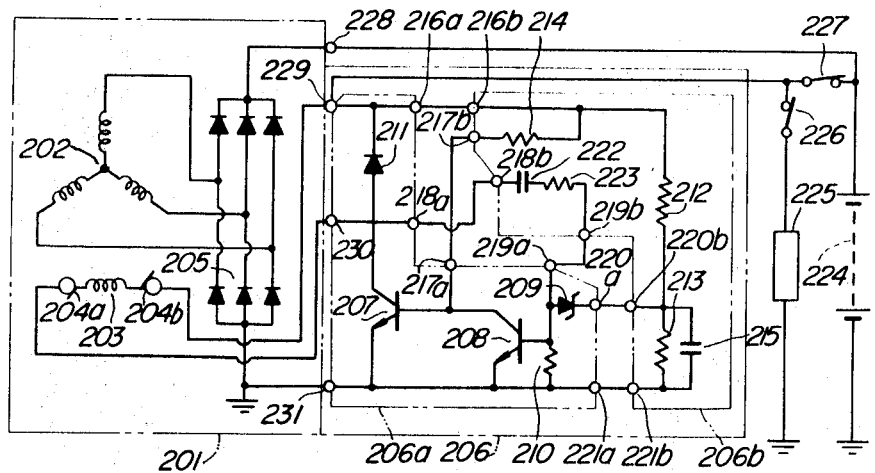
FIG. 7 is an electrical circuit diagram of a charging generator apparatus for vehicle use including a semiconductor-type voltage regulator of a further embodiment according to the present invention.

In FIG. 7, numeral 201 designates a rectifier self-contained AC generator comprising armature windings 202 of the three-phase star connection type, a field winding 203, a pair of brushes 204a and 204b, and a full-wave rectifier 205, the generator being driven by an engine (not shown). Numeral 206 designates a semiconductor-type voltage regulator comprising a relay circuit member 206a principally composed of active elements such as transistors and diodes, and a passive element circuit member 206b having passive elements such as resistors and capacitors.

THe relay circuit member 206a comprises a transistor 207 interrupting energization of an l load or the field winding 203, a transistor 208 for switching the transistor 207, a voltage detecting Zener diode 209, a bias resistor 210 biasing the transistor 207, and a diode 211 for absorbing a surge voltage occuring in the l load, while the passive element circuit member comprises dividing resistors 212 and 213 for establishing a voltage which will be applied to the Zener diode 209, a relay base resistor 214, and an oscillation preventing and operation stabilizing capacitor 215. Both the circuit members 206a and 206b whose respective terminals 216a and 216b, 217a and 217b, 218a and 218b, 219a and 219b, 220a and 220b, and 221a and 221b, are electrically connected to each other by means of conductors, respectively, provide required electrical connections therebetween. Numerals 222 and 223 designate a capacitor and a resistor which form a feedback circuit, respectively. The relay circuit member 206a and passive element circuit member of the voltage regulator 206, respectively, are constructed by a semiconductor integrated circuit and a thick film integrated circuit in which the passive elements are evaporated or baked on a substrate of ceramic, which both integrated circuits are suitable for integration of the constituent elements and are in the form of blocks. The passive element circuit member 206b is detachably stacked on the relay circuit member. Numeral 224 designates car batteries, 225 car electrical loads, 226 a load switch, and 227 a key switch. Numeral 228 designates a battery terminal for the generator 201, 229 a positive terminal of the voltage regulator 206, 230 a terminal of the regulator 206 for the field winding, and 231 an earth terminal thereof. Referring to FIG. 8, there is shown a structure of the relay circuit member 206a and the passive element circuit member 206b. Numerals 217a, 219a, 220a, and 221a in FIG. 8 designate connecting terminals serving as the terminals 217a, 219a, 220a, and 221a shown in FIG. 7, which are formed in such a manner that conductor materials connected to the active elements contained in the relay circuit member 206a are bent along the sides of the member 206a. Character A designates a lead wire for characteristic measurements of a complete relay circuit member. On the other hand, numerals 219b, 220b, and 221b in FIG. 8 designate lead terminals formed in a substrate of ceramic in the passive element circuit member 206b, which serve as the terminals 219b, 220b, and 221b shown in FIG. 7, the respective terminals being formed in recess-shape so as to engageably fit the lead terminals 219a, 220a, and 221a therewith, respectively. The lead terminals 219b, 220b, and 221b are connected to the respective elements of the passive element circuit member 206b by printed wiring. Character A' is a connecting terminal for characteristic measurements, which is engageable with the connecting terminal A. Numeral 212 in FIG. 8 designates a resistor exposed in the passive element circuit member 206b, which corresponds to the resistor 212 of FIG. 7. The relay circuit member 206a and the passive element circuit member 206b shown in FIG. 8 are tightly engaged to each other whereby the connecting terminals of both the members are also engaged with one another, and thereafter by soldering the engaged portions between the lead terminals, the working of joining both the circuit members 206a and 206b to each other is finished and at the same time, the electrical connection therebetween is also achieved. Further, the set voltage of the voltage regulator can be adjusted as desired by suitably cutting out the exposed adjustable resistor 212. Thus, due to the resistor 212 the deviation of the set voltage during a manufacture of the voltage regulator can be easily corrected.

Referring to FIGS. 9a and 9b there are shown structural views of a complete voltage regulator according to the present invention. Numerals 233, 234, 235, and 236 designate soldered points between the respective lead terminals of the relay circuit member 206a and the passive element circuit member 206b. Numeral 237 designates a radiating plate and terminal member which is fitted on the surface of the passive element circuit member 206b, the member being formed in such a size as to cover substantially the whole surface area of the passive element circuit member 206b for obtaining good dispersion of heat conducted through resin material of the circuit member 206b. In addition, the combined radiating plate and terminal member 237 is soldered to the connecting point between the terminals 221a and 221b shown in FIG. 7, which also serves as the earth terminal 231. Numeral 238 designates a member serving as a radiating plate as well as a terminal, which is fitted on the surface of the relay circuit member 206a and formed in such a size as to cover all most the whole of the surface area of the relay circuit member 206a for providing good dispersion of heat conducted through resin material thereof. The member 238 is soldered to the connecting point between the terminals 216a and 216b shown in FIG. 7, which also serves as the positive terminal 229. Numeral 239 designates a further member serving as a radiating plate and a terminal, which is connected through a stop 241 with a lower terminal 240 connected to the collector electrode of the transistor 207 in FIG. 7 and also serves as the field terminal 230. After the combined radiating plate and terminal members 237, 238 and 239 are fitted to the relay circuit member 206a and the passive element circuit member 206b both the circuit members 206a and 206b are moulded by resin material 242 integrally.

Referring to FIG. 10, there is shown a structure of mounting on a generator a voltage regulator according to the present invention. Numerals 243 and 244 designate bolts. THe bolt 243 electrically connects the combined radiating plate and terminal member 238 of the voltage regulator 206 with a fitting member 245 of the brush 204b shown in FIG. 7, said member 245 being made in such a form capable of being used in common as to be a fitting one for the voltage regulator 206. To an end frame 246 of the generator 201 the bolt 243 is fixedly secured through a bush 247 by a washer 248 and a nut 249. On the other hand, the bolt 244 electrically connects the combined radiating plate and terminal member 239 of the voltage regulator 206 with a further fitting member 250 of the brush 204a shown in FIG. 7, the fitting member 250 also being made in such a form capable of being used in common as like that of the regulator 206. To a further end frame 246 of the generator 201 the bolt 244 is fixedly secured through a bush 251 by means of a washer 252 and a nut 253. In addition, the combined radiating plate and terminal member 237 of the regulator 206 is made in contact directly with the end frame 246. Numerals 254 and 255 designate connecting terminals for connecting the brushes 204a and 204b with the fitting members 245 and 250 respectively. According to the above-mentioned construction, not only the voltage regulator 206 and the brushes 204a and 204b can be mounted integrally on the end frame 246 of the generator 201 by using the combined radiating plate and terminal members 237, 238, and 239 and the fitting members 245 and 250, but also the regulator 206 can be connected thermally and electrically conductively between the brushes 204a and 204b and the generator 201. Furthermore, the bolt 243 is connected through the key switch 227 to the positive pole of the batteries 224 by a conductor (not shown).

Now, reference is made of the operation of the above-mentioned construction according to this embodiment hereunder. A voltage induced across the armature windings of the generator 20, is rectified by the full-wave rectifier 205 and thereafter the rectified voltage is introduced in the batteries 224 through the terminal 228 to charge the batteries and at the same time fed to the electrical loads 225. On the other hand, a field current passing from the key switch 227 to the combined radiating plate and terminal member 239 via the bolt 243, the fitting member 245, the brush 204b, the field winding 203, the brush 204a, and the fitting member 150, is controlled in response to the output voltage of the generator which is applied to the voltage regulator 206 through the member 238, whereby the output voltage of the generator is maintained at the set voltage. As a result charging of the batteries 224 is properly performed all the time.

Furthermore, heat generated in the voltage regulator 206 can be dispersed thermally conductively to the end frame 246 and the bolts 243 and 244 by paths from the member 237 directly to the end frame 246 and from the members 238 and 239 to the bolts 243 and 244, thus providing a sufficient dispersion effect for the voltage regulator 206.

Further, if a space portion in the lower surface of the regulator 206 is filled with resin material such heat can be dispersed toward the end frame 246 by way of the whole lower surface of the regulator 206. On the other hand, since after the relay circuit member 206a and the passive element circuit member 206b are fitted with the radiating plate and terminal members 237, 238, and 239, these members are moulded in an integral structure, such voltage regulator provides a strong structure against vibration.

In the voltage regulator 206, when the generator 201 is a high power one, high capacity transistors may be used in the relay circuit member 206a. Therefore, even when the set voltage of the voltage regulator 206 is varied or the output of the generator is increased, only of change of either said circuit members will do, so that the voltage regulator according to the present invention is very economical.

We claim:

1. A semiconductor-type voltage regulator for use with a generator, said regulator comprising:
   a first integrated circuit integrating transistors and diodes,
   a separate second film integrated circuit integrating resistors and capacitors on a ceramic substrate to facilitate substitution of differently valued passive parameters and thereby to change the characteristics of said regulator,
   at least one heat radiating plate to which both said first and second integrated circuits and said ceramic substrate are thermally connected,
   connecting terminals mounted on and thermally connected to said heat radiating plate for both thermally and electrically connecting said regulator to the structure of said generator, and
   metal conductors electrically connecting said first integrated circuit, said second integrated circuit and said connecting terminals.

2. A voltage regulator as in claim 1 wherein said connecting terminals have a flat rectangular cross section and a hole for receiving a mounting bolt thereby facilitating a good thermal and electrical connection to said generator.

3. A semiconductor-type voltage regulator for use with a generator, said regulator comprising:
   an active element integrated circuit including at least one transistor for interrupting a field winding of said generator, and a Zener diode for detecting the voltage of said generator,
   a passive element integrated circuit including dividing resistors for establishing a voltage to be applied to said Zener diode, and wherein
   said passive element integrated circuit is in stacked relationship and electrically connected to said active element integrated circuit thereby minimizing the size of said regulator.

4. A voltage regulator as in claim 3 wherein:
   said active element integrated circuit includes a plurality of lead terminals extending at an angle with respect to the plane of said active circuit, and
   said passive element integrated circuit includes a plurality of connecting terminals for mating with said lead terminals when said stacked relationship exists between said circuits.

5. A voltage regulator as in claim 4 wherein said passive element integrated circuit includes an exposed resistor such that the exposed resistor may be externally adjusted to a set point value.

6. A charging generator apparatus equipped with a semiconductor-type voltage regulator comprising:
   a plurality of combined heat radiating and terminal means for serving as heat radiators as well as electrical connectors,
   each of said combined means attached to an active element integrated circuit or to a separate passive element integrated circuit which elements comprise said voltage regulator,
   a brush holder having fitting members adapted to mate with fitting terminals for said regulator,
   said combined means and said fitting members and said fitting terminals being used to integrally fit said voltage regulator and said brush holder with said generator, and
   said regulator being thermally and electrically connected between said brush holder and said generator.